Sept. 23, 1941.　　　G. TRAUTVETTER　　　2,256,837
VEHICLE BODY CONSTRUCTION AND METHOD OF FABRICATION
Filed Aug. 3, 1935　　　10 Sheets-Sheet 5
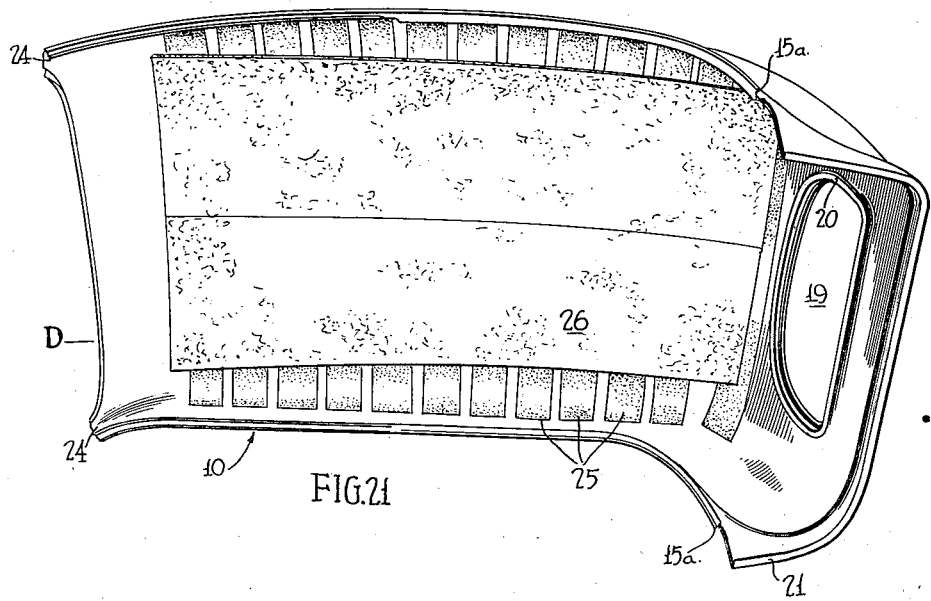
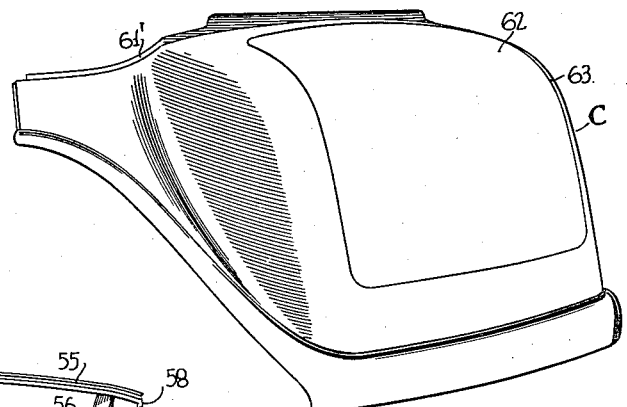
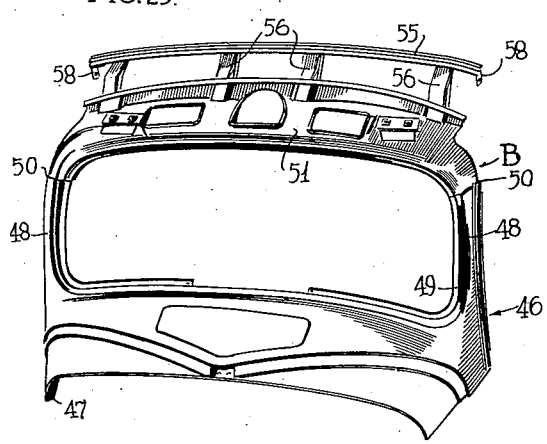
INVENTOR.
GEORGE TRAUTVETTER.
BY
John P. Tarbox
ATTORNEY.

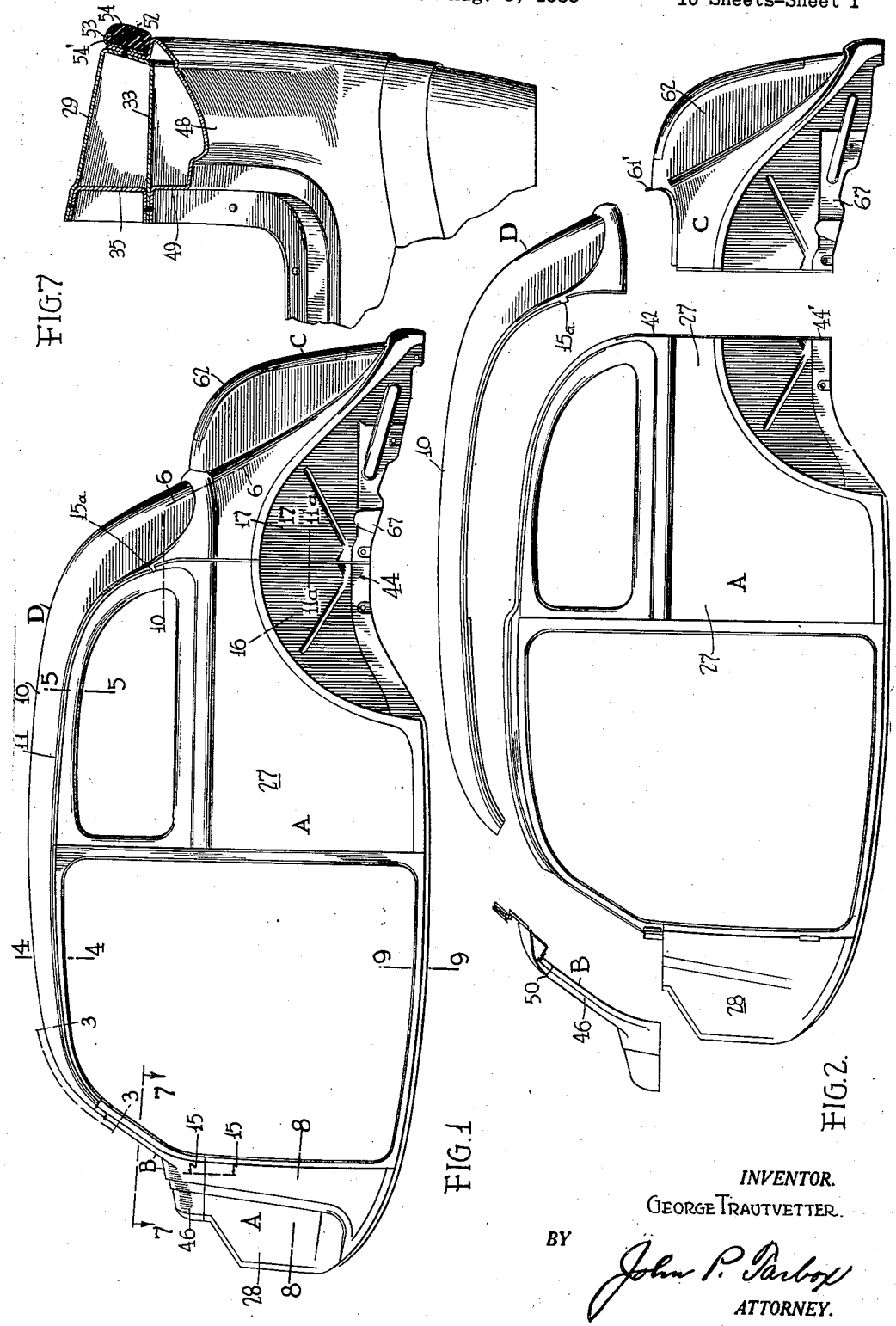

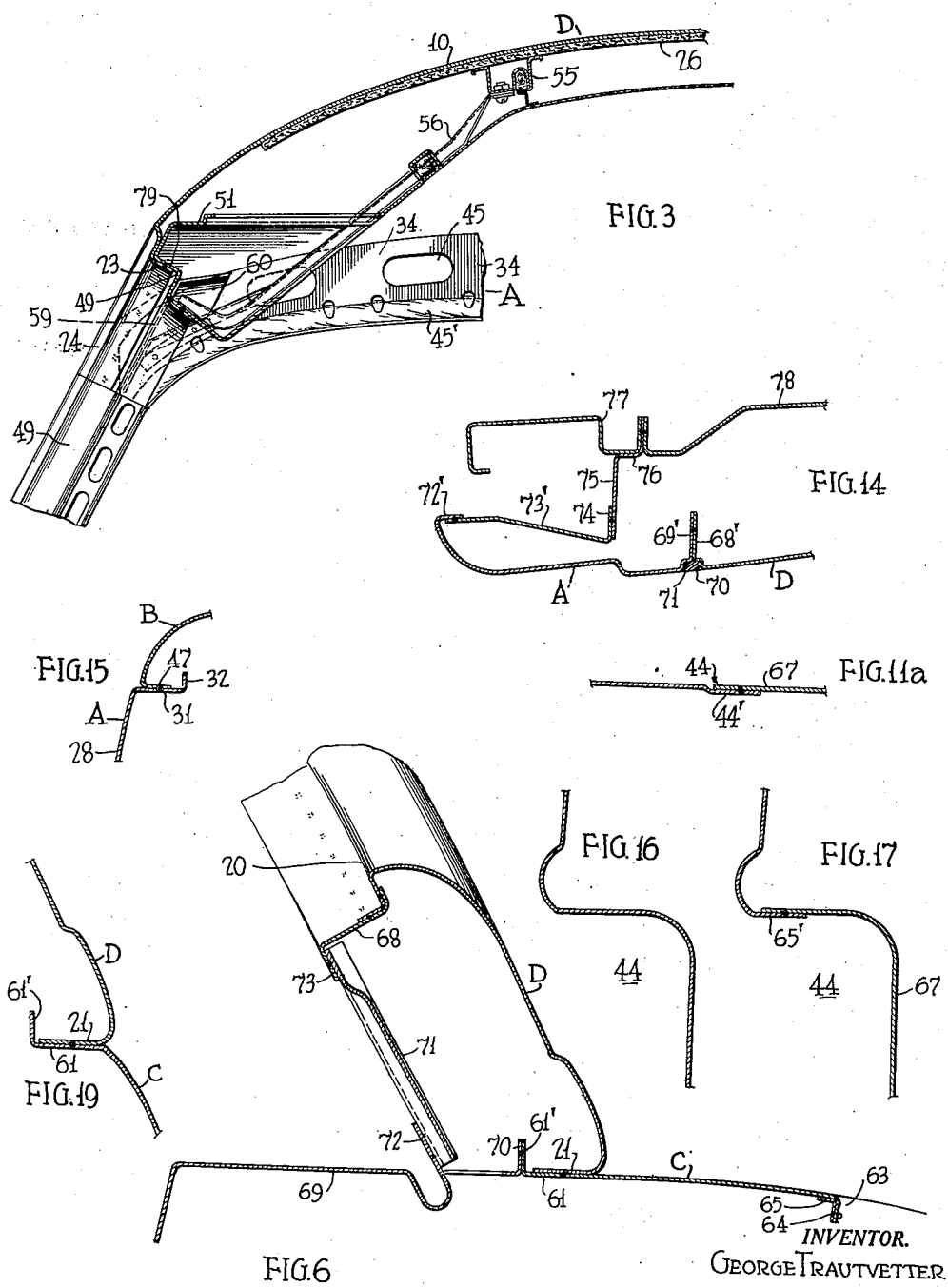

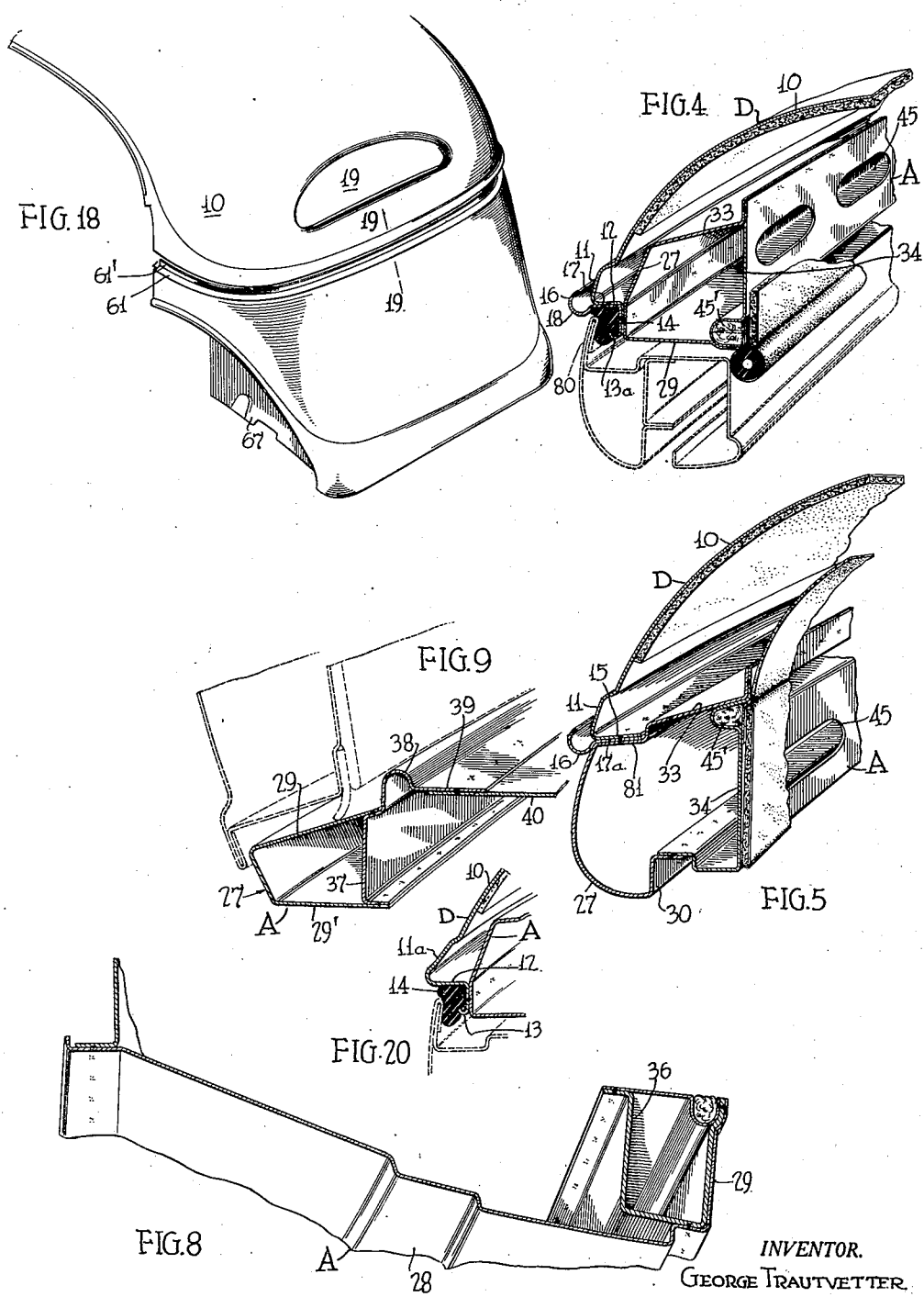

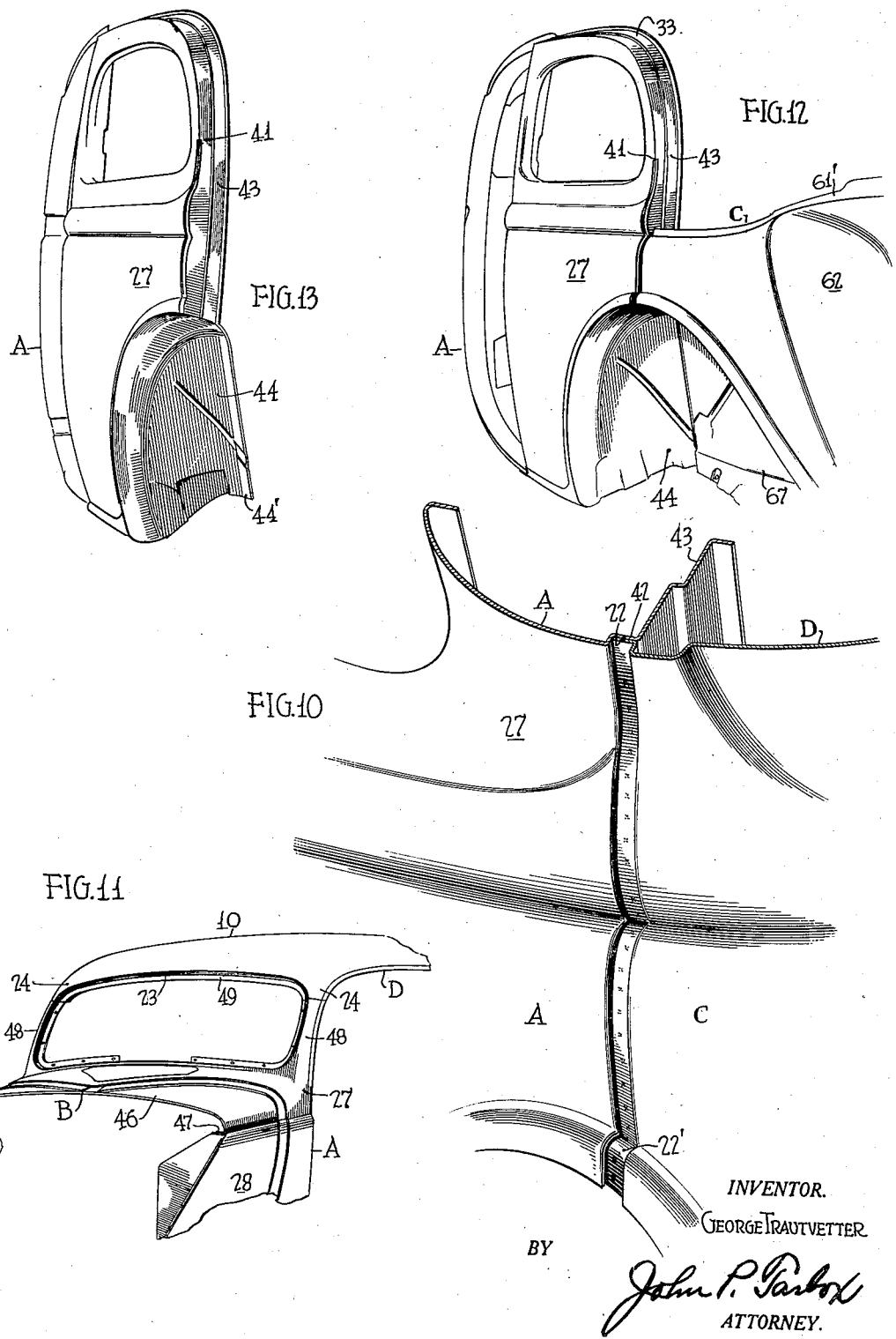

Sept. 23, 1941.　　　G. TRAUTVETTER　　　2,256,837
VEHICLE BODY CONSTRUCTION AND METHOD OF FABRICATION
Filed Aug. 3, 1935　　　10 Sheets-Sheet 6
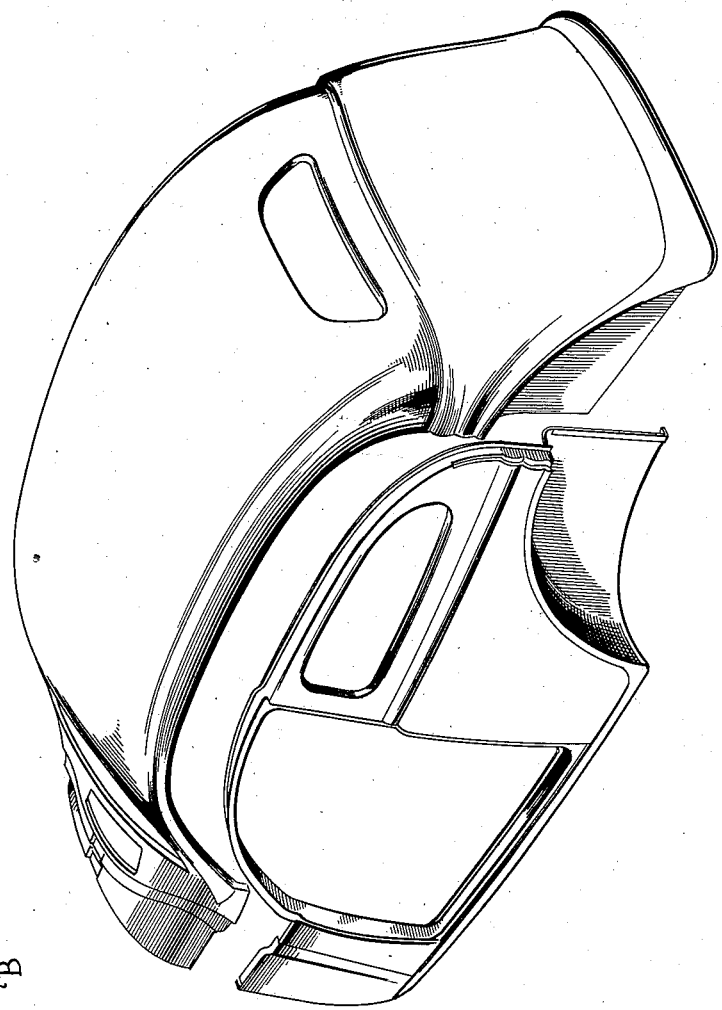
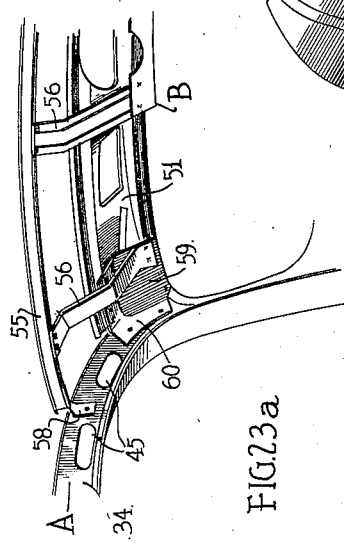
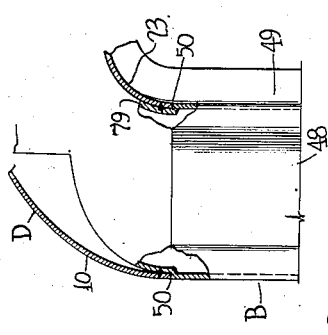
INVENTOR.
GEORGE TRAUTVETTER.
BY
ATTORNEY.

Sept. 23, 1941.  G. TRAUTVETTER  2,256,837
VEHICLE BODY CONSTRUCTION AND METHOD OF FABRICATION
Filed Aug. 3, 1935  10 Sheets-Sheet 7
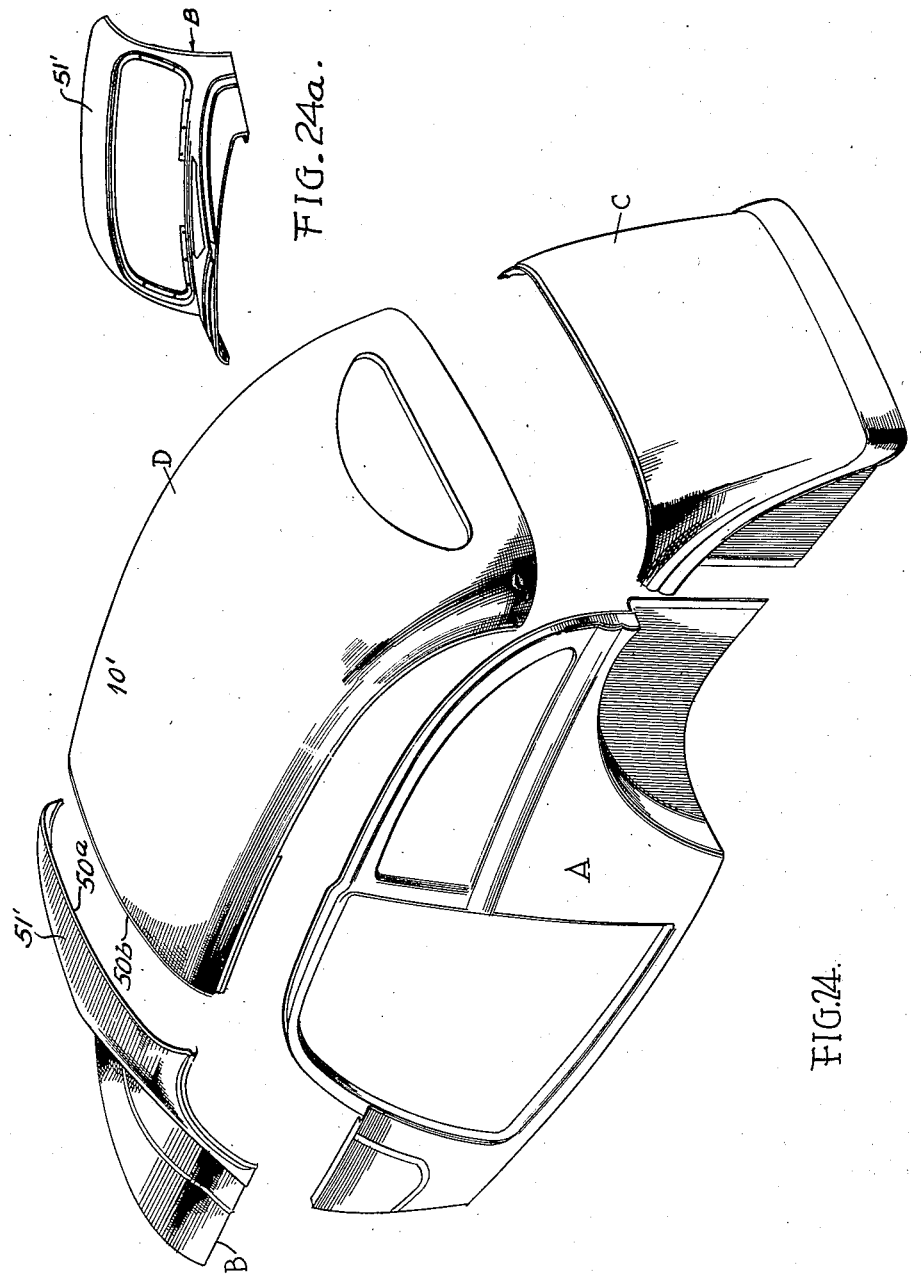
INVENTOR.
GEORGE TRAUTVETTER
BY
ATTORNEY.

Sept. 23, 1941. G. TRAUTVETTER 2,256,837
VEHICLE BODY CONSTRUCTION AND METHOD OF FABRICATION
Filed Aug. 3, 1935 10 Sheets-Sheet 8

INVENTOR.
GEORGE TRAUTVETTER.
BY
ATTORNEY.

Sept. 23, 1941.   G. TRAUTVETTER   2,256,837
VEHICLE BODY CONSTRUCTION AND METHOD OF FABRICATION
Filed Aug. 3, 1935   10 Sheets-Sheet 9

INVENTOR.
GEORGE TRAUTVETTER.
BY
John P. Tarbox
ATTORNEY.

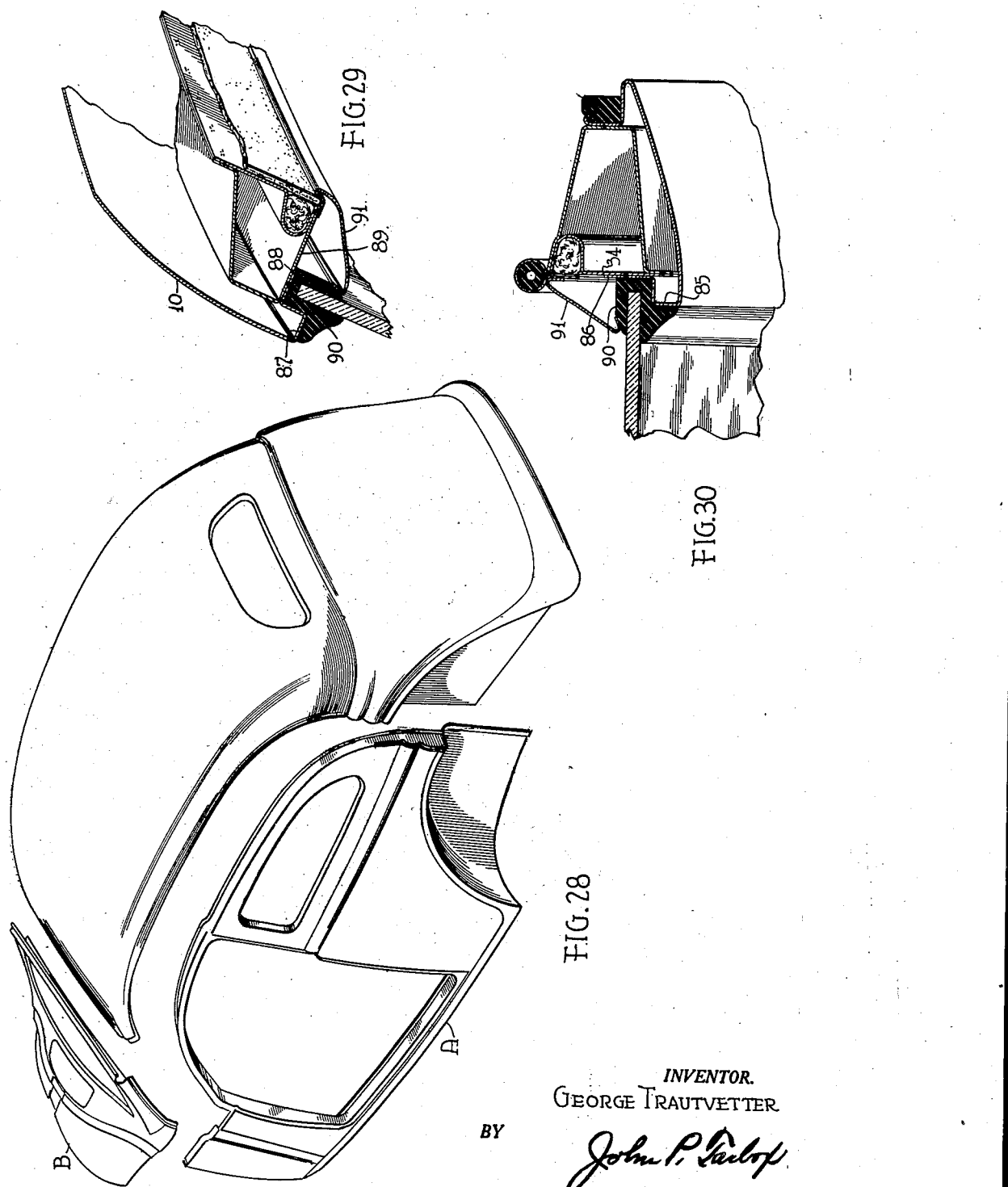

Patented Sept. 23, 1941

2,256,837

UNITED STATES PATENT OFFICE 2,256,837

VEHICLE BODY CONSTRUCTION AND METHOD OF FABRICATION

George Trautvetter, Philadelphia, Pa., assignor to Edward G. Budd Manufacturing Company, Philadelphia, Pa., a corporation of Pennsylvania Application August 3, 1935, Serial No. 34,493

13 Claims. (Cl. 296—137)

The invention relates to sheet metal vehicle bodies and particularly to bodies of this class, the outer walls of which are fabricated of relatively few large sheet metal stampings.

It is an object of the invention to construct a body of this class in sub-assembly units which may be readily shipped in nested relation and finally assembled in regions remote from the place of manufacture of the sub-assembly units, thereby effecting a substantial saving in shipping costs.

It is another object of my invention to so form the margins of the sub-assembly units that they may be readily joined in the final assembly by readily available assembling machinery and by relatively unskilled workmen and the joints are so formed that such joinder may be effected substantially throughout by straight line spot or pinch welding in such manner that the joinder may be expedited and a minimum of finishing of the joints is required after the final assembly.

It is another object of the invention to so form the sub-assemblies as to make them self-sustaining and not liable to serious injury in shipment.

These and other objects and advantages are attained, according to a preferred form of the invention, by constructing the body of two side sub-assemblies, a roof sub-assembly and a front and rear sub-assembly but, if desired, the front and/or rear sub-assemblies may be combined into a unitary sub-assembly with the roof sub-assembly. The side sub-assemblies are of an extent to form a substantial portion of the side of the cowl, the framing around the doorway opening or openings, the framing around the rear quarter window, if any, and may terminate in their rear edges in a substantially vertical margin extending from the rear quarter window opening downwardly through the wheel housing. The roof sub-assembly according to one form of the invention comprises a unitary stamping extending from the tops of the A-posts and the windshield opening and forming the margin of said opening in longitudinally arched formation to include the rear window opening and terminates at the back below said opening, on a marginal joint portion for securement to the top of a rear sub-assembly. The roof unit sub-assembly is transversely arched and extends from side to side to form the complete roof and is formed along its lateral margins with joint formations for securing it to the tops of the side units and in its A-post portions with joint formations for securing it to a front and the side units. According to this form of the invention, the front unit sub-assembly comprises a unitary stamping including the top of the cowl and so much of the sides of the cowl as is not formed by the side sub-assemblies, and the upwardly extending A-post covers formed in their rear margin for securement to the A-post portions of the side sub-assemblies and in the top margins for securement to the roof and in their inner margins with formations corresponding to the formation in the front margin of the roof and with the rear margin of the top of the cowl to form the windshield framing. The tops of the A-post portions of the front stamping are interconnected by a transversely extending windshield header to the front margin of which is secured the front margin of the roof stamping in the final assembly operation. According to this form of the invention, a rear unit sub-assembly may be a unitary stamping forming the rear portions of the wheel housing and the rear lower portion of the body which terminates in its upper margin in a final assembly joint mating with the final assembly joint of the roof unit and in its lateral margins with final assembly joint formations mating with the rear vertical margins of the side units. The marginal conformations and the form of the stampings themselves forming the outer paneling of the various units are such as to add to the strength of the units, namely, of channel or angle form for the most part, and also to facilitate the final assembly of the body when the units are brought together in the final assembly by simple pinch welding operations substantially throughout and so as to avoid substantially all joint finishing operations which have heretofore added quite substantially to the cost of the final assembly operations. However, where desired, the units may be provided in sub-assembly with internal reinforcements of their main stampings affording additional strength as required. Such internal reinforcements are, however, so arranged as not to interfere with the facility of the final assembly operations.

The invention lends itself, however, to considerable modification without substantial loss of the advantages which form the main objects thereof, and among such modifications may be mentioned the formation of the outer paneling of the roof unit and the front unit of the form already described in a unitary stamping and/or the formation of the outer paneling of the front unit, the roof unit and the rear unit in a single unitary stamping, such variations depending mainly upon the size of the presses available and other shop conditions, and upon the type of body to which the invention is applied. Still other modifications, some of which will be hereinafter described, are possible, and these also attain in large part the objects and advantages set forth above. All of them lend themselves readily to simple joinder in final assembly by, in the main, simple pinch welding operations, of the sub-assembly units and the avoidance of numerous exterior joints which require extensive cleaning operations. By this construction also the extensive flash welding equipment required for flash welding the joints is entirely eliminated, relatively simple and easily operated spot welding machinery being substantially the only equipment required in the final assembly operations. Such equipment can be readily obtained at relatively small expense and installed at various final assembly locations, and its operation does not require the high operation skill required in flash welding operations.

Other and further objects and advantages and the means whereby they are attained will become apparent from the following more detailed description when read in connection with the accompanying drawings.

In the drawings,

Fig. 1 is a side elevational view of a sedan type of body constructed in accordance with the invention.

Fig. 2 is an exploded side elevational view showing the various sub-assembly units as they appear just prior to final assembly in the completed body.

Fig. 3 is a central longitudinal vertical sectional view extending through the region indicated by the dotted line 3—3 of Fig. 1 and showing the joint between the front of the roof unit and the top of the front unit.

Fig. 4 is a fragmentary perspective view, parts being shown in section taken substantially on the line 4—4 of Fig. 1 showing the joint between the roof unit and a side unit.

Fig. 5 is a view similar to Fig. 4 taken on the line 5—5 of Fig. 1.

Fig. 6 is a fragmentary central vertical longitudinal sectional view in the region indicated by the dotted line 6—6 of Fig. 1.

Fig. 7 is a fragmentary sectional view, as seen in plan, on the line 7—7 of Fig. 1.

Fig. 8 is a corresponding view on the line 8—8 of Fig. 1.

Fig. 9 is a fragmentary perspective view, parts being shown in section, indicated by the line 9—9 of Fig. 1.

Fig. 10 is a fragmentary perspective view, parts being shown in section in the region indicated by the dotted line 10—10 of Fig. 1.

Fig. 11 is a fragmentary front perspective view of the front of the assembled body.

Fig. 11a is a detail sectional view on the line 11a—11a of Fig. 1.

Fig. 12 is a fragmentary perspective view of the side sub-assembly and connected rear sub-assembly as seen from the rear.

Fig. 13 is a similar view of the side sub-assembly per se.

Fig. 14 is a horizontal sectional view taken substantially along the line 10—10 of Fig. 1 showing a slight modification of the joint in this region, and including inner reinforcing paneling.

Fig. 15 is a vertical sectional view, indicated by the line 15—15 of Fig. 1, through the joint between the side and top portions of the cowl.

Fig. 16 is a vertical section through the wheel housing portion of the rear unit showing the wheel housing made as in integral stamping with the rear unit.

Fig. 17 is a similar view of a slight modification in which the wheel housing is made as a separate stamping.

Fig. 18 is a perspective view as seen from the rear showing a modified form of rear unit in position for assembly with the roof unit.

Fig. 19 is a fragmentary sectional view along the line 19—19 of Fig. 18 showing the joint between the rear and roof unit.

Fig. 20 is a detail sectional view similar to Fig. 4 showing a slight modification of the joint between the roof unit and the side unit.

Fig. 21 is an underneath perspective view of the roof unit showing sound-deadening padding applied thereto.

Fig. 22 is a perspective view as seen from the rear of the rear unit minus the wheel housing stamping shown in Fig. 17.

Fig. 23 is a front perspective view of the front unit with the front roof bow attached.

Fig. 23a is a fragmentary perspective as seen from the inside showing the manner of attachment of the front and side units.

Fig. 23b is a fragmentary, part front elevation and part sectional view of the joint between the front and roof units.

Fig. 24 is an exploded view in perspective as seen from the rear showing a different line of division between the front and roof units.

Fig. 24a is a view in perspective as seen from the front of the windshield frame unit of the body shown in Fig. 24.

Fig. 27 is a view similar to Fig. 24 of a still further modification in which the front, rear and roof units are all combined as a unitary stamping.

Fig. 28 is a view similar to Fig. 18, of a further modification in which the roof and rear units are formed as an integral stamping.

Fig. 29 is an fragmentary detail perspective view, parts being in section, showing the joints between roof and front units where the invention is applied to a fixed or vertically slidable windshield construction.

Fig. 30 is a similar view showing the joint between front and side units under similar conditions.

Figure 25:
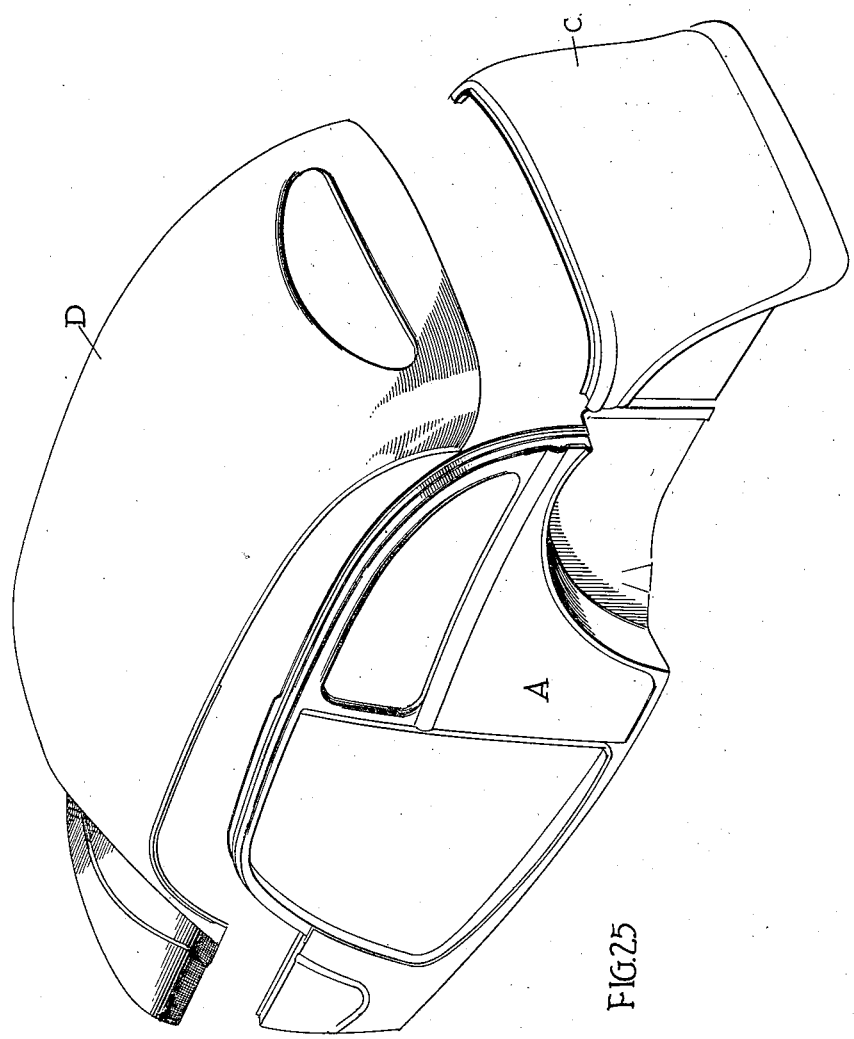
Fig. 25 is a view similar to Fig. 24 showing a construction in which the front and roof units are united in a single sub-assembly unit.

A principal feature of the invention according to all the modifications is the formation of the roof unit as a single stamping extending the full width of the roof and including the side quarters in the transverse direction and longitudinally forming a substantial portion of the relatively flat top portion and extending down at at least one end to form a framing surrounding the window opening in the end wall.

According to a preferred form of the invention as shown in Figs. 1 to 23b, inclusive, the completed body is fabricated in two side-sub-assemblies A, a front sub-assembly B, a rear sub-assembly C and a roof sub-assembly D.

The roof sub-assembly D in this form of the invention comprises a unitary outer panel stamping 10 extending transversely the full width of the roof and downwardly at the sides substantially to the tops of the doorway openings, its side edges above each doorway opening being formed with an outwardly projecting bead 11 or 11a, see Figs. 4 and 20, below which it is formed to provide an angular rabbet 12, the lower margin of which may be formed, as in Fig. 20, with a curved reverse bent edge flange 13 for the purpose of holding a weatherstrip 14 in the rabbet against which the edge of the door may close. Rearwardly of the door opening as indicated in Fig. 5, the bead is continued but the rabbet is not present, the edge of the roof being merely flanged inwardly as indicated at 15, and this beaded formation and flange extends downwardly at the rear side margins to the location 15a, see Figs. 1 and 21, adjacent the bottom of the rear quarter window opening, the bead there merging with a widened bead extending around the rear edge of the roof stamping.

The drip molding may be made integral with the bead 11 as shown at 11a in Fig. 20 or it may be made as a separate stamping 16 as in Fig. 4, which stamping includes the reversely curved marginal portion 13a, an angular portion 17 fitting within the rabbet 12 of the margin of the roof and secured to both arms as indicated, and an outer channel portion 18 projecting outwardly beyond the margin of the roof. This drip stamping 16 extends from the extreme front of the roof to the location 15a and in rear of the door opening as in the roof stamping, the rabbet 17 is converted into an inwardly extending flange portion 17a (see Fig. 5) of the drip channel extended to overlap the inwardly extending flange of the roof stamping. Where this separate drip channel 16 is used it is preferably spot welded to the marginal portion of the roof throughout its extent and thus serves to strongly reinforce the margin of the roof sub-assembly.

At the rear the roof stamping is extended downwardly substantially to the belt line to include within its margins the rear window opening 19 in the margin of which it is flanged inwardly and rabbeted, as indicated at 20 to frame said opening and form the outer side and bottom wall of the glass run channel. The lower rear margin of the roof sub-assembly extends across the rear of the body and around the rear quarters substantially to the rear margins of the rear quarter window openings, and in its rear margin it is beaded and flanged inwardly at 21, (see Figs. 6, 19 and 21) the bead and flange providing a stiffened margin for the sub-assembly and the flange serving as a final assembly joint.

From the point where the drip channel ends at the rear the roof stamping has its substantially vertically extending margin formed with an offset flange 22, (see Fig. 10) to stiffen its margin and the flange serving as a final assembly joint.

At the front, the roof stamping is extended downwardly to form the outside face of the top windshield header and is flanged inwardly at 23 (see Fig. 3) to form a final assembly joint and part of the windshield framing. At the sides, the roof stamping is extended downwardly through short projections 24 including as parts thereof lateral and downward extensions of the flange 23, which projections are adapted to form final assembly joints with the tops of the front units as will be more particularly hereinafter pointed out.

The roof unit being of compound curvature and flanged or otherwise reinforced throughout substantially its entire margin provides a stiff sub-assembly structure well adapted for shipment in nested relation and by reason of its marginal construction well adapted for easy joinder in final assembly with adjoining units.

For sound-deadening purposes the roof unit may, prior to final assembly, be provided with a plurality of layers 25, 26 of suitable sound-deadening material, one of said layers, as 25, being laid transversely in spaced strips while the other layer 26 is laid longitudinally. This sound deadening material may be secured in place to the metal panel by a suitable adhesive, and in final assembly is further pressed against the metal roof stamping, by longitudinally spaced roof bows only one of which is indicated at 55 in Fig. 3.

According to this form of the invention the side units A are each formed as a single outer panel stamping 27 forming a side of the cowl 28 and flanged inwardly at 29, (Figs. 4, 7 and 9) to form the frames of the doorway opening or openings and further flanged inwardly at 30 to form a frame including a rabbet to receive the rear quarter window, (Fig. 5). The side unit terminates at the rear of the rear quarter window opening in a substantially vertical rear margin extending downwardly to the bottom of the body and through the wheel housing.

In the region of the cowl portions 28 the side unit is flanged inwardly at 31, Fig. 15 and upwardly at 32 to reinforce the margins in this region and to form a final assembly joint structure. In the region extending from the top of the cowl over the tops of the doorway openings and the rear quarter window openings, the side unit is flanged inwardly at 33 at the top to form with the flanges 29 at the tops of the doorway and window openings a substantially continuous inwardly facing channel. (See Figs. 4, 5 and 7.) To further reinforce the side units in this region, these inwardly facing channels may be closed to box section over the door and window openings by inner paneling 34 spot welded to their side walls (see Figs. 4 and 5), and, in the region of the A-post (see Fig. 7) along the side of the windshield opening, by a channel section inner reinforce 35 telescoped within the channel formed by the outer panel and secured thereto by spot welding.

In the A-post region the side units may be further reinforced below the top line of the cowl in the region of the door hinge securement by inner post structures of box cross section, as indicated at 36, (see Fig. 8). At the tops these post structures may tie in directly with the channel section A-post portions shown in Fig. 7 extending along the sides of the windshield opening. Other door post portions in the side unit stampings may have similar inner reinforcements.

At the bottom, as shown in Fig. 9, the inwardly facing channel section threshold portions formed by flanges 29 in the threshold of the outer panel stamping and flanges 29' in the lower margins thereof may be reinforced by the channel section inner panel 37 telescoped between the side walls of the channel and spot welded thereto. This channel member 37 may be extended upwardly to form a threshold bead 38 and inwardly by flange 39 through which it is secured to the floor plate 40, which may also be fabricated as a separate sub-assembly unit secured in final assembly to the side units through the flanges 39 by a simple spot welding operation. At the rear vertically extending margin and from the location 41 (Figs. 12 and 13), to the wheel housing the side unit stamping 27 is formed with an offset flange 42 Fig. 10, corresponding to the offset flange 22 on the roof unit and forming therewith and with the adjoining edge of the rear unit a final assembly joint. In the preferred form as shown in Figs. 10, 12 and 13, this offset is formed in the outer portion of the inwardly extending flange 43 forming a vertical continuation of the top flange 33 and providing the rear wall of the glass run channel for the rear window opening. Throughout the vertical margin of the wheel housing portion 44 thereof the rear edge of the side unit is merely offset at 44' an amount equal to the thickness of the metal to form a lapped joint with an adjoining unit. See Fig. 11a.

The inner reinforcing panels 34 and 35 are preferably formed with a plurality of elongated openings 45 to afford ready access to the interior of these hollow sections in the final assembly operations. They may also be formed with channels as 45' for receiving upholstery securing strips.

The front unit sub-assembly according to this form of the invention may comprise a single stamping as seen in Fig. 23 and designated by the numeral 46 which forms the top of the cowl and the complete windshield frame extending thereabout. The cowl portion of the stamping is extended downwardly at the sides to form the upper portions of the sides of the cowl and in its lower side margins it is flanged inwardly at 47 (see Fig. 15) to form final assembly joints with the side units. The upwardly extending portions 48 at the sides of the windshield opening as well as the transversely extending upper and lower windshield headers are formed with a rabbet 49 to receive the edge of the windshield. These upwardly extending portions form the outer faces of the posts substantially to the top of the windshield opening where they are offset inwardly at 50, Figs. 23 and 23b, and form an inner reinforcing top header 51 for the top of the windshield opening. The vertical rear side edges of the front unit from the lower edge to the point 50 are provided with a rabbet 52, see Fig. 7, corresponding to the rabbet 12 in the roof panel and having a reversely bent margin 53 for securing and holding in place the weatherstrip 54 similar to weatherstrip 14 at the margins of the roof unit and forming extensions thereof against which the door closes. As shown in Fig. 7 this reverse bend is made in a separate strip 54' spot welded to the margin of the front stamping, although it may alternatively be made as an integral part of the front stamping as indicated in Fig. 20 in connection with the roof stamping.

The front unit may additionally comprise a flanged channel section roof bow 55 spaced from the rearwardly offset top header portion 51 of the front stamping and secured to it through a number of spaced channel section braces 56. The ends of the channel section roof bow are formed with downwardly extending tabs 58 adapted to form final assembly joints for joinder to the side units. Similarly, the sides of the offset top header portion 51 (see Figs. 3 and 23a) are provided with angular gussets, each having one arm as 59, spot welded to the transversely extending top header portion 51 and the other arm as 60 extended rearwardly and adapted to form a final assembly joint structure for attachment to the adjacent side unit.

The rear sub-assembly unit C extends from side to side around the rear quarter terminating in substantially vertical edges in the region just rearwardly of the rear quarter window opening. At the top this unit terminates at the belt and is there formed with a horizontal flange 61 terminating in an upwardly extending flange 61' (see Figs. 6 and 19) extending from side to side and adapted to enter into the final assembly joint with the roof unit. In the form shown in Fig. 6 this rear unit includes in the single stamping the trunk housing 62 and has the trunk opening 63 within its margins, being flanged inwardly at 64 to frame said opening. An angular reinforce 65 may be used to reinforce the edge of the trunk housing opening. Where no trunk is desired the construction of the rear unit may be that illustrated in Figs. 18 and 19 in which the rear unit extends downwardly in conformance with the roof unit lines.

As shown in Fig. 16 the rear unit stamping is formed with the wheel housing portion integral therewith but, in order to facilitate the nesting during shipment, it is preferable to form the rear unitary stamping only with an inwardly extending flange 65' at the top of the wheel housing as shown in Fig. 17 and to secure thereto before or after the final assembly to the side and roof units separate wheel housing stampings 67 as by spot welding. The rear unit prior to such assembly is shown in Fig. 22.

As shown in Fig. 6, the roof unit may be reinforced in the angular flange 20 framing the rear window opening by a Z-section member 68 having its arms nesting with the angle forming the outer side and bottom of the glass receiving channel 20 and secured thereto by spot welding. The rear unit C may be extended forwardly at the top by a transversely extending inner panel stamping 69 having a flange formed in its rear edge at 70 overlapping and spot welded to the flange 61' on the rear unit. This panel 69 may be braced to the reinforcement 68 extending around the rear window opening by a brace 71 secured to a struck-out portion 72 of the panel 69 and to the arm 73 of the reinforcement 68.

The sub-assembly units as so constructed are readily assembled in the final assembly by bringing together their marginal flanged edges and spot welding them together, in most cases by straight line pinch welding operations. For example, the side units A may be assembled to the floor plate 40 as shown in Fig. 9 by spot welding the inwardly extending flanges 39 to the lateral edges of the floor plate. The front unit B may then be assembled with the side units by bringing the lateral flanges 47 of the cowl portion of the front stamping in overlapping relation with the laterally extending flange 31 at the top of the cowl side portions of the side stampings as shown in Fig. 15 and spot welding them together. The door edge receiving rabbet 52, see Fig. 7, will then be in position to overlap the outer face of the front post portion 29—33 of the side unit sub-assembly and can readily be secured thereto by spot welding. The windshield receiving rabbet 49 of the front stamping overlaps the front wall 33 of the front post of the side stamping and may be secured thereto as shown in Fig. 7 by pinch welding. At the top, as shown in Figs. 3 and 23a, the arms 60 of the gussets overlap the inner panels 34 of the side units and are secured thereto by spot welding. Similarly the tabs 58 on the front roof bow 55 likewise overlap the panels 34 and are secured to the side units by spot welding. The rear unit C with the wheel housing 67 preferably pre-assembled thereto and also the floor plate, not shown, assembled to its lower edges, (although this floor plate may be assembled subsequently to the assembly of the rear unit with the side units) may be assembled with the side units by bringing the front edges of the wheel housing portions thereof, see Fig. 11a, in overlapping relation with the offset rear edge 44' of the side units and spot welding thereto. Above the wheel housing the joinder between the rear and side units is effected through the inwardly offset flanges 22' and 42 on the respective units which overlap in this region and are spot welded together. The shallow channel formed by the joint in this region as shown in Fig. 10, may be filled with solder flush with the outer faces of the panels to provide a continuous unbroken surface.

In Fig. 14, there is shown an alternative form of joint in this region formed by overlapping inwardly extending flanges 68' and 69', respectively, formed on the rear unit D and the side unit A and adapted to be secured together by pinch welding. The outer panel adjacent these flanges is slightly offset inwardly to provide an outwardly facing shallow channel 70' which is filled flush with the outer paneling by a filling of solder 71'. In this modification the rearwardly extending flange 72 forming the outer wall of the glass run for the rear quarter window is reinforced by a rearwardly extending panel 73' spot welded to it, this panel having an inwardly extending flange 74 in the plane of the rear wall of the glass run channel. This flange 74 is extended by an extension 75 having an angular offset at its inner margin 76 receiving in nested relation the inwardly opening channel formed rear margin of the inner panel 77 and secured thereto by spot welding. The panel 77 extends forwardly and inwardly at its front edge and rearwardly to form the inner wall of the glass run for the rear quarter window. Subsequent to the assembly of the joint 68'—69', the inner panel 77 may be extended rearwardly into the rear outer panel sub-assembly by an inner panel 78 secured at its front end by an inwardly extending flange to the joint between the members 76 and 77.

After the assembly of the side unit A, front unit B and rear unit C, the roof unit D is brought down into position for final assembly with the margins of the adjoining units. At the front the inwardly extending flange 23, see Figs. 3, 11 and 23b, overlaps the inwardly extending wall 79 of the rabbeted portion 49 of the inwardly offset top header portion of the front unitary stamping and is secured thereto by spot welding. As clearly shown in Fig. 23b, the upper portions of the post cover and side windshield frame portions of the front stamping are formed with an offset at 50 equal in depth to the thickness of the roof panel and the roof panel D and the lateral downward extensions 23, 24 from the roof panel fit into this offset flush with the outer face of the front stamping therebelow and are spot or otherwise welded thereto to form a flush joint between the outer face of the roof and the outer face of the front stamping, as clearly appears from Figs. 3, 11 and 23b.

The lateral margins of the roof stamping throughout the regions of the doorway openings extend downwardly to the doorway openings as shown in Figs. 4 and 20, and their rabbeted margins 12 receiving the edge of the door indicated in dotted lines at 80 are secured by a line of spot welds to the outer face of the channel section rail 33, 29 formed in the side unit stamping above the doorway openings. Ready access is had for this welding operation through the openings 45 provided in the inner panel 34. Rearwardly of the door openings the inwardly extending flanges 15 in the margin of the roof overlap the downwardly offset seat 81, see Fig. 5, formed in the inwardly extending top flange 33 of the side units and are secured thereto by a line of spot welds as is clearly shown in Fig. 5, this joint extending rearwardly and downwardly to the location 41 (Figs. 12 and 13) adjacent the lower edge of the rear quarter window opening. From there on downwardly the roof and side units are joined through the inwardly offset overlap flange portions 22, 42, shown in Fig. 10, which joint is finally made flush with the outer face of the paneling by filling the shallow channel formed at the joint by solder in a manner similar to that indicated in Fig. 14, this joint 22, 42 being in vertical construction of the joint 22, 42 between the side and rear units, see Fig. 10. The rear lower marginal flange 21 of the roof stamping overlaps the horizontal portion 61 at the upper margin of the rear unit C just rearwardly of the upwardly extending marginal flange 61' in its top margin and is secured thereto by a line of spot welds extending all the way from a position adjacent the rear of one rear quarter window around the back and forwardly to a position adjacent the other rear quarter window.

It will be seen that the hereinbefore described method of assembly may be employed whether or not the rear assembly unit uses a trunk projection as shown in Figs. 1, 6 and 22, or is extended downwardly substantially in continuation of the lines of the rear portion of the roof sub-assembly as shown in Figs. 18 and 19.

The invention lends itself quite readily to modification particularly with respect to the extent of the roof sub-assembly stamping. This is particularly true in connection with the modern streamline shapes in which the windshield inclines sharply rearwardly and the rear wall of the body similarly inclines downwardly on a gradual incline.

According to the form of the invention shown in Figs. 24 and 24a, the side and rear units A, C may be the same as in the preferred form but the front and roof units B, D have their line of joinder 50' formed transversely in the relatively longitudinally flat portion 10' of the roof rearwardly of the windshield top header 51'. This transverse joint 50' may be made by inwardly offset flanges 50a, 50b secured together through the bottom of the offset in the manner shown in the joint of Fig. 10 between the side, rear and top units, the channel so formed by the joint being filled with solder to make a smooth, flush, outer surface. The joinder between the front and roof units and the remaining units remains the same as in the preferred form already described.

According to the form of the invention shown in Fig. 25, the side unit A and the rear unit C may be as in the preferred form or the form of Fig. 18, while the roof unit is extended downwardly at the front to include the windshield opening and the top of the cowl, thus combining the front and roof units of the preferred form. Where large presses are available this form of the invention may be preferable since it involves fewer parts and eliminates the more or less difficult joint at the top of the front posts. The joinder of this combined roof and front unit to the side and rear units may be entirely similar to that described in connection with the joinder of the front and roof units of the preferred form shown in Fig. 1, namely, by continuous lines of spot welds in the flanged lapped margins.

Figure 26:
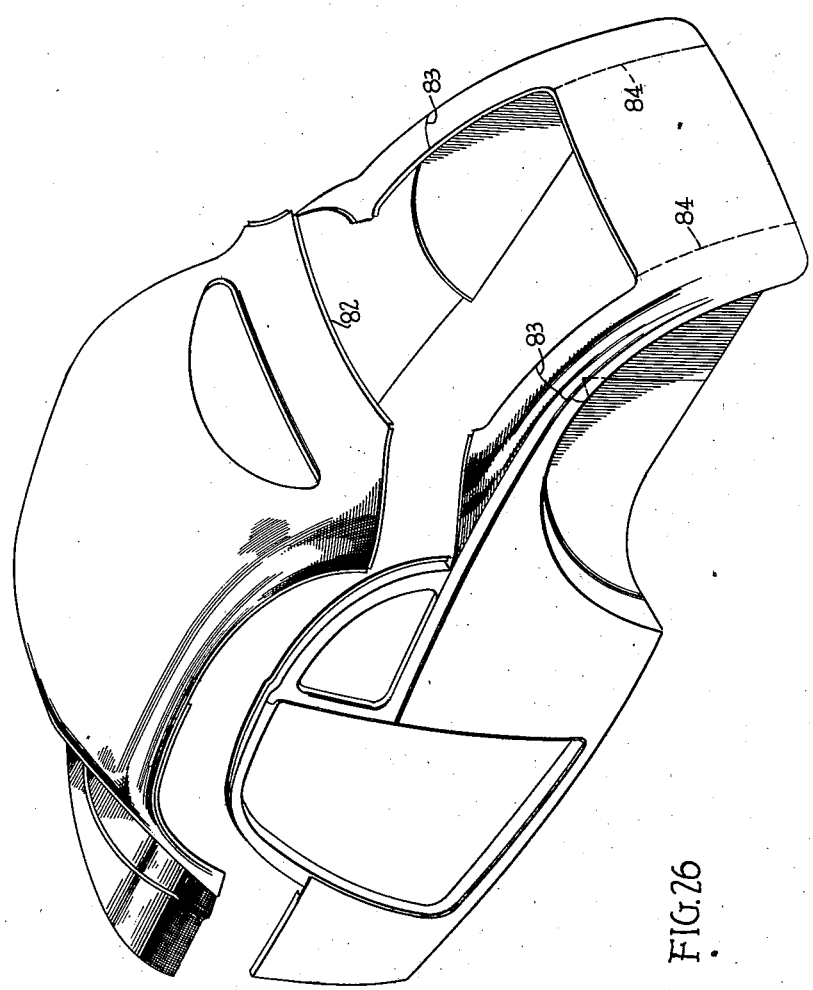
Fig. 26 is a view similar to Fig. 25 showing a unit construction similar generally to that disclosed in that figure as applied to a coupe type of body having a deck opening.

In Fig. 26 I have shown the modification generally according to Fig. 25 as applied to a coupe type of body. According to this modification, the rear edge of the roof unit terminates at and forms the inwardly flanged margin 82 of the deck opening, the joinder between the combined front and roof unit stamping from the front of the cowl to the bottom of the rear quarter window conforming substantially to the joinder in this region in the preferred form. From the bottom of the rear quarter window opening, the joint between the roof and side units extends diagonally to the corner of the deck opening through which region the roof and side units are joined together by lapped flanges in the manner disclosed, for example, in Fig. 19 or other form of joint which can be readily connected by spot welding. The side units A in this form of the invention may be extended rearwardly to the rear end of the body where large presses are available to form the side unit in one piece or they may terminate in the lines 83, the rear portion of the body rearwardly of those lines being formed as a separate stamping and being secured in the manner of securement of the rear stamping to the side stamping in the preferred form of the invention. Where the side unit stampings are extended clear to the rear of the body, a separate panel, the lateral margins of which are indicated by the dotted lines 84, is welded to the side units, and extends between the lines 84 in a lateral direction and between the rear end of the body and the rear edge of the deck opening. The construction shown in this modification may also be used in the sedan type of body where an opening similar to the deck opening in a coupe type of body is provided below the rear window opening.

According to a still further modification of the invention, the front, roof and rear units of Figs. 1 and 18 may all be formed in a single stamping as shown in Fig. 27. Such a construction, however, requires very large presses and is desirable only by reason of the fact that it eliminates some of the final assembly joints of the previous modifications. According to this construction, and, in fact, in any of the modifications employing a rear unit including portions of the wheel housings, for ease of formation the wheel housing portion would preferably be formed as a separate stamping as shown in Fig. 17 and secured to the main stamping also as shown in that figure. The remainder of the joints between this combined front, roof and rear unitary stamping forming the entire top portion of the body and the side units will be substantially the same as those already described in connection with the preferred form.

A still further modification of the construction shown in Fig. 1 may be that shown in Fig. 28 in which the roof and rear unit substantially as shown in Figs. 1 and 18 are combined in a unitary stamping. The remainder of the joints would be substantially the same as those already described in connection with the construction of Figs. 1 and 18.

Where a fixed or vertically sliding windshield is desired, the margins of the front and roof units may be formed as shown in the sectional views of Figs. 29 and 30. In these views the front unit is shown as provided with an inwardly extending molding 85 forming the outer wall of the glass run and the garnish around the outside of the windshield at the sides and bottom of the windshield opening, the inner side wall of this molding being extended by flange 86 and secured to the inner panel 34 of the box section post forming a part of the side unit. Similarly the roof unit is extended down by a bead 87 as shown in Fig. 29 forming the outer side wall of the glass receiving channel and the garnish for the windshield opening at the top. This bead 87 is likewise extended in by a flange 88 which flange is secured by spot welding to the top inside header 89 forming a part of the front stamping. In this form of the invention the top header is shown of somewhat different cross section from that disclosed in the form shown in Figs. 6 and 23a, but its function is substantially the same as in those figures. In these Figs. 29 and 30 the edge of the windshield is shown received in channel section rubber weatherstrips 90 which are held in place by an inner molding strip 91. This construction around the windshield opening is, of course, adaptable to either of the modifications than the modification shown in Fig. 1.

In all of the foregoing modifications the main objects of the invention are achieved, namely, the fabrication of the outer paneling of a body in relatively few main stampings which are of a form to permit their ready nesting in shipment and which can be assembled at various final assembly locations by simple spot welding operations. Most of the final assembly joints are hidden and effected by simple line welding operations with a pair of pinch welders. The construction is a highly practical one and one which lends itself readily to quantity production of the units at a main production plant and their shipment to various final assembling plants and easy final assembly at those plants. The construction is one which lends itself to extensive variation in the various types of bodies and under various shop conditions and in the following claims it is intended to cover all such variations as readily fall within the purview of those skilled in the art.

What I claim is:

1. A roof unit forming a main strength member of a closed vehicle body structure comprising a unitary stamping arched transversely and longitudinally and forming substantially the entire generally horizontally extending top portion of the body between the windshield and the rear wall, said stamping in transverse dimension extending from side to side of the body and downwardly substantially to the tops of the door openings, and longitudinally having said top portion extended at the front by a downward extension, said downward extension being formed with a windshield opening within its margins and flanged inwardly at said opening to frame the same, the outer margins of said stamping being provided with final assembly joint formations adapted in the final assembly to mate with and be joined to adjacent portions of the body wall.

2. A roof unit forming a main strength member of a closed vehicle body structure comprising a unitary stamping arched transversely and longitudinally and forming substantially the entire generally horizontally extending top portion of the body between the windshield and the rear wall, said stamping in transverse dimension extending from side to side of the body and downwardly substantially to the tops of the door openings, and longitudinally having said top portion extended downwardly at both front and rear, said downward extensions being formed respectively with a windshield opening and a rear window opening within their margins and flanged inwardly at said openings to frame the same, the outer margins of said stamping being provided with final assembly joint formations adapted in the final assembly to mate with and be joined to adjacent portions of the body wall.

3. A roof unit forming a main strength member of a closed vehicle body structure comprising a unitary stamping arched transversely and longitudinally and forming substantially the entire generally horizontally extending top portion of the body between the windshield and the rear wall, said stamping in transverse dimension extending from side to side of the body and downwardly substantially to the tops of the door openings, and longitudinally having its top portion extended at the front and flanged to frame at least the top portion and a substantial part of the side portions of the windshield opening and at the rear having a downward extension, said downward extension being formed with a window opening within its margins and flanged inwardly at said opening to frame the same, the outer margins of said stamping being provided with final assembly joint formations adapted in the final assembly to mate with and be joined to adjacent portions of the body wall.

4. A roof unit forming a main strength member of a closed vehicle body structure comprising a unitary stamping arched transversely and longitudinally and forming substantially the entire generally horizontally extending top portion of the body between the windshield and the rear wall, said stamping in transverse dimension extending from side to side of the body and downwardly substantially to the tops of the door openings, and longitudinally having said top portion extended at the front to form the outer face of the top windshield header and framing for the top of the windshield, and the outer faces of at least a substantial part of the upper portions of the A posts, said top portion being further extended at the rear by a downward extension.

5. A roof unit forming a main strength member of a closed vehicle body structure comprising a unitary stamping arched transversely and longitudinally and forming substantially the entire generally horizontally extending top portion of the body between the windshield and the rear wall, said stamping in transverse dimension extending from side to side of the body and downwardly substantially to the tops of the door openings, and longitudinally having said top portion extended at the front by a downward extension, said downward extension being formed with a windshield opening within its margins and flanged inwardly at said opening to frame the same, the stamping being extended forwardly from the lower edge of the windshield opening to form the top portion of the cowl, the outer margins of said stamping being provided with final assembly joint formations adapted in the final assembly to mate with and be joined to adjacent portions of the body wall.

6. A roof structure for a vehicle body comprising a member arched longitudinally to form a deck portion and having end portions diverging downwardly from said deck portion, one of said end portions being provided with an opening for a windshield and the other of said end portions being provided with an opening for a rear window.

7. A vehicle body including a rear panel, and associated side panels; and a roof member arched longitudinally and transversely having an intermediate deck portion and terminating at one end in a front cowl panel, a pair of spaced pillars providing an opening for a windshield connecting said front cowl panel to said intermediate deck portion, said roof member terminating at its opposite end in a rear panel having an opening for a rear window, said roof member having flanges extending downwardly therefrom secured to the side panels of said vehicle body, said roof member being in the nature of a truss resisting stresses due to twisting or weaving of said vehicle body.

8. In a vehicle body, an integral sheet metal stamping including windshield framing, top, and rear quarter panel, said stamping having a flange at its lateral edge extending from the base of the windshield pillars to the base of the rear quarter panel, said flange lying in a curved longitudinal arch, said flange mating with and being secured to complemental flanges on the vehicle body to provide a reinforced longitudinal arch structure at the sides of the vehicle body.

9. A transverse upper panel unit forming a main strength member of a closed vehicle body structure comprising a unitary stamping arched transversely and longitudinally and forming at least a large part of the generally horizontally extending top portion of the body behind the windshield, said stamping in transverse dimension extending from side to side of the body and downwardly substantially to the tops of the door openings, and longitudinally having said top portion extended at the front by a downward extension, said downward extension being formed with a windshield opening within its margins and flanged inwardly at said opening to frame the same, the outer margins of said stamping being provided with final assembly joint formations adapted in the final assembly to mate with and be joined to adjacent portions of the body wall.

10. A transverse upper panel unit forming a main strength member of a closed vehicle body structure comprising a unitary stamping arched transversely and longitudinally and forming at least a large part of the generally horizontally extending top portion of the body behind the windshield, said stamping in transverse dimension extending from side to side of the body and downwardly substantially to the tops of the door openings, an longitudinally having its top portion extended at the front and flanged to frame at least the top portion and a major part of the side portions of the windshield, the outer margins of said stamping being provided with final assembly joint formations adapted in the final assembly to mate with and be joined to adjacent portions of the body wall.

11. A transverse upper panel unit forming a main strength member of a closed vehicle body structure comprising a unitary stamping arched transversely and longitudinally and forming at least a large part of the generally horizontally extending top portion of the body behind the windshield, said stamping in transverse dimension extending from side to side of the body and downwardly substantially to the tops of the door openings, and longitudinally having said top portion extended at the front to form the outer face of the top windshield header and framing for the top of the windshield, and the outer faces of at least a major part of the upper portions of the A posts.

12. A transverse upper panel unit forming a main strength member of a closed vehicle body structure comprising a unitary stamping arched transversely and longitudinally and forming at least a large part of the entire generally horizontally extending top portion of the body behind the windshield, said stamping in transverse dimension extending from side to side of the body and downwardly substantially to the tops of the door openings, and longitudinally having said top portion extended at the front by a downward extension, said downward extension being formed with a windshield opening within its margins and flanged inwardly at said opening to frame the same, the stamping being extended forwardly from the lower edge of the windshield opening to form the top portion of the cowl, the outer margins of said stamping being provided with final assembly joint formations adapted in the final assembly to mate with and be joined to adjacent portions of the body wall.

13. In a vehicle body, an integral sheet metal stamping including windshield framing and at least a large part of the generally horizontally extending body top, said stamping having a flange at its lateral edge extending from the base of the windshield pillars to the rear end of the stamping, said flange lying in a curved longitudinal arch, said flange mating with and being secured to complemental flanges on the vehicle body to provide a reinforced longitudinal arch structure at the sides of the vehicle body.

GEORGE TRAUTVETTER.